Oct. 1, 1968  W. F. ALLER  3,403,448
GAGING DEVICE

Filed June 7, 1965  3 Sheets-Sheet 1

INVENTOR.
WILLIS FAY ALLER

BY Ernest J. Hiy

ATTORNEY

Oct. 1, 1968

W. F. ALLER
GAGING DEVICE 3,403,448

Filed June 7, 1965

INVENTOR.
WILLIS FAY ALLER

BY Ernest J. Idt

ATTORNEY

Oct. 1, 1968   W. F. ALLER   3,403,448
GAGING DEVICE

Filed June 7, 1965   3 Sheets-Sheet 3

INVENTOR.
WILLIS FAY ALLER

BY *Ernest J. H*

ATTORNEY

United States Patent Office

3,403,448
Patented Oct. 1, 1968

3,403,448
GAGING DEVICE
Willis Fay Aller, Dayton, Ohio, assignor to The Bendix Corporation, a corporation of Delaware
Filed June 7, 1965, Ser. No. 461,753
12 Claims. (Cl. 33—174)

ABSTRACT OF THE DISCLOSURE

A precision measuring machine having improved geometric construction features which makes possible improved precision measurement. A basic load carrying skeletal structure is employed in which the primary load carrying way is fixed on the base. The worktable, measuring element supporting structure, and a stabilizing way are all adjustable to provide necessary precision required.

---

This invention pertains to measuring machines and more particularly to precision coordinate measuring machines.

One object of this invention is the provision of an improved coordinate measuring machine which is of simple construction, economical to fabricate, easy to maintain, and having geometric features making possible improved precision.

Another object of this invention is the provision of a precision measuring machine which has structural features provided to make the setup, adjustment, and operation thereof as efficient and easy as possible.

Figure 1:
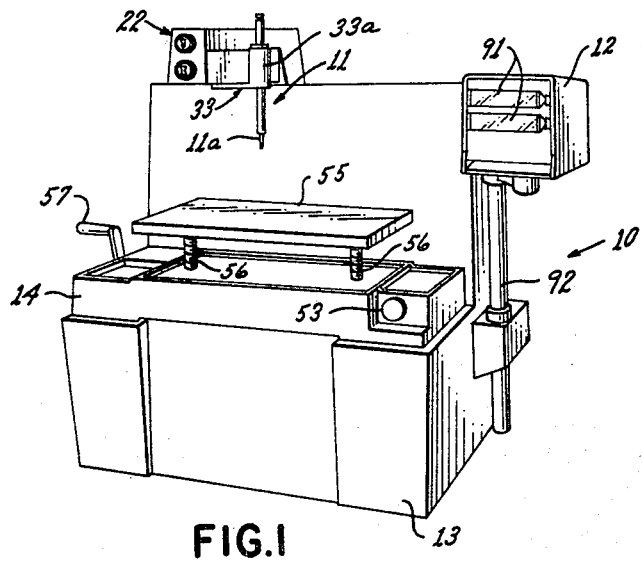
Figure 2:
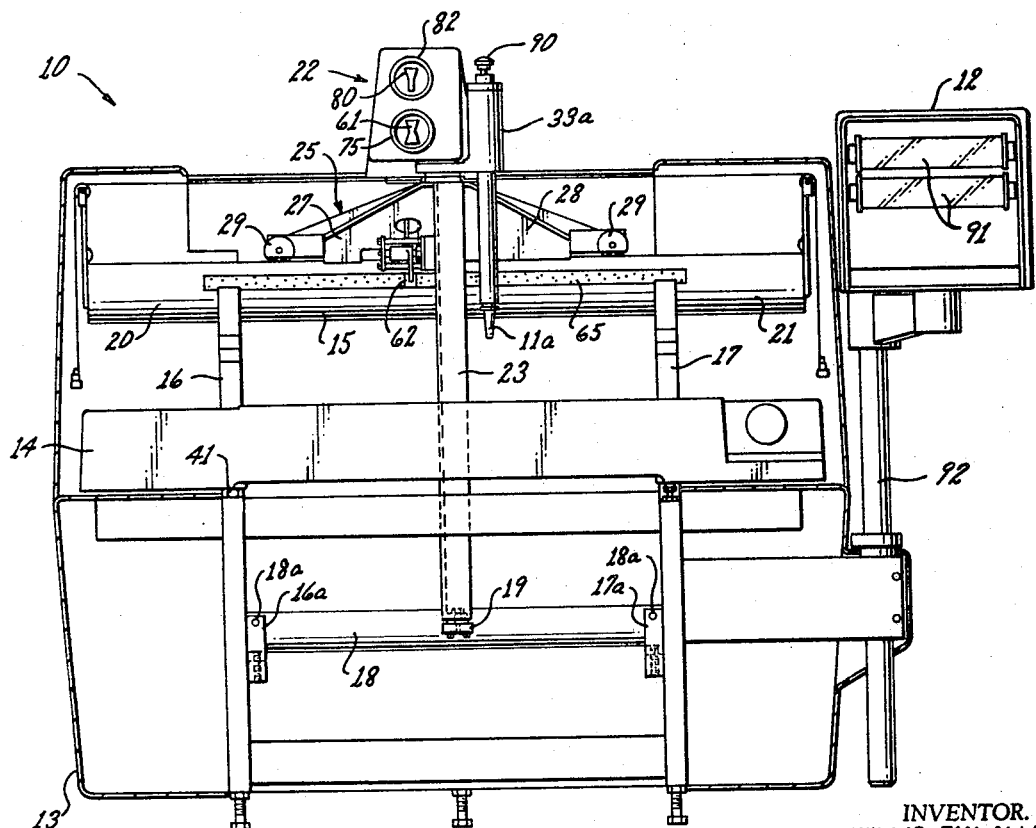
Figure 3:
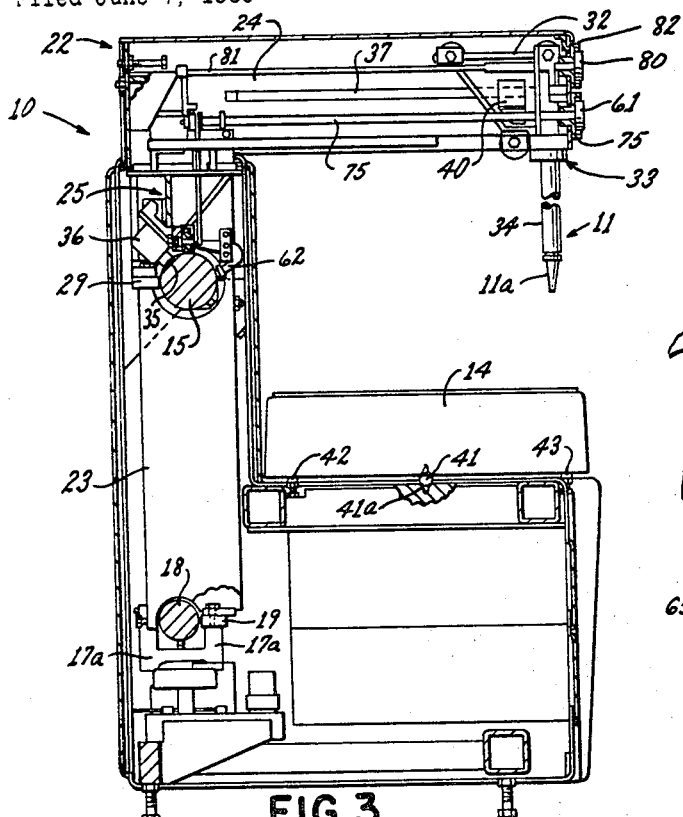
Figure 4:
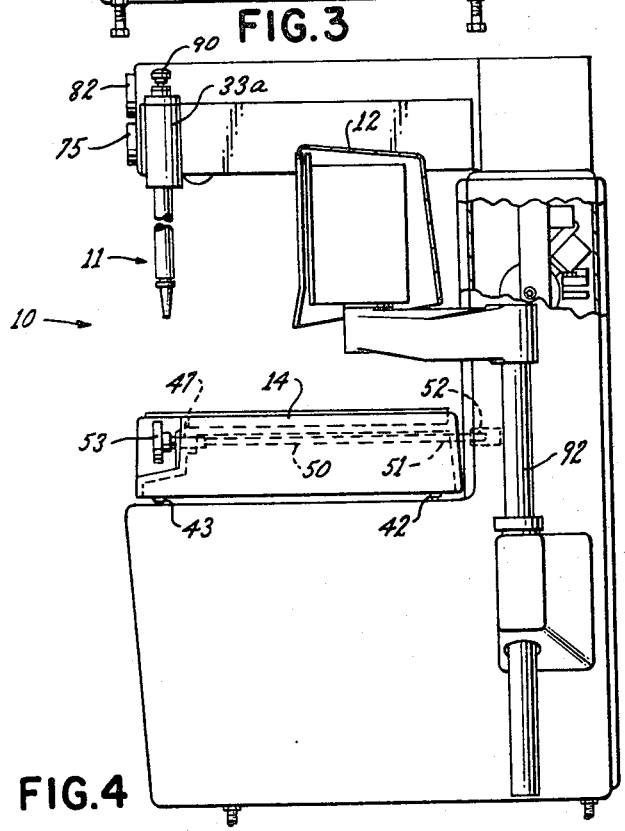
Figure 6:
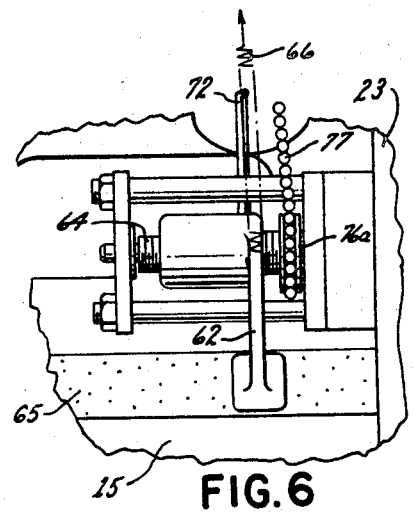
Figure 5:
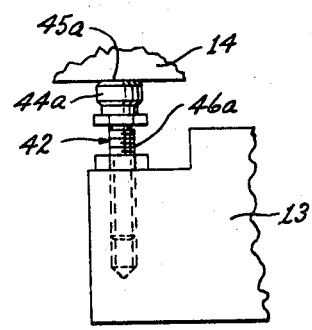
Figure 8:
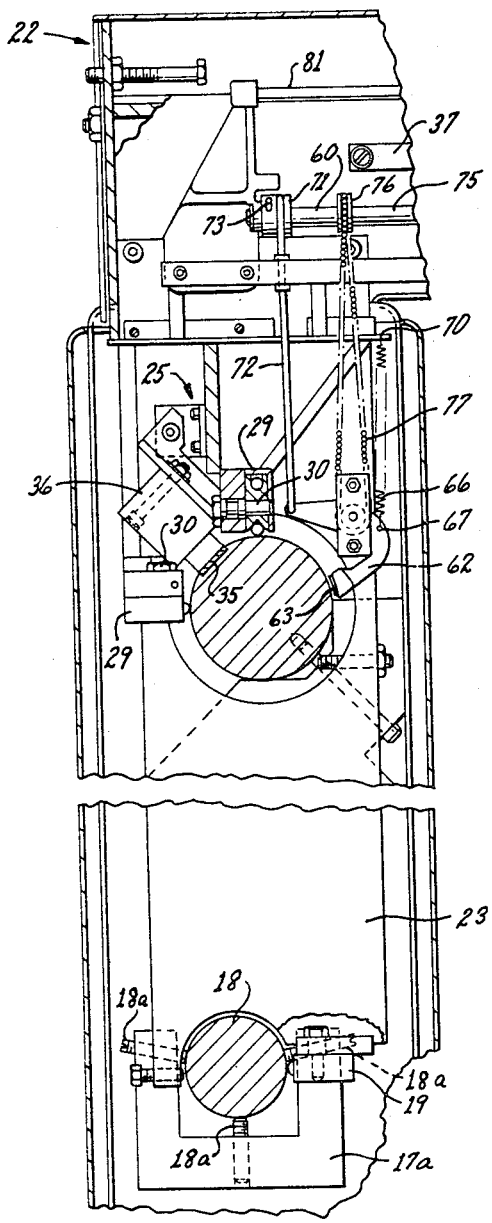
Figure 7:
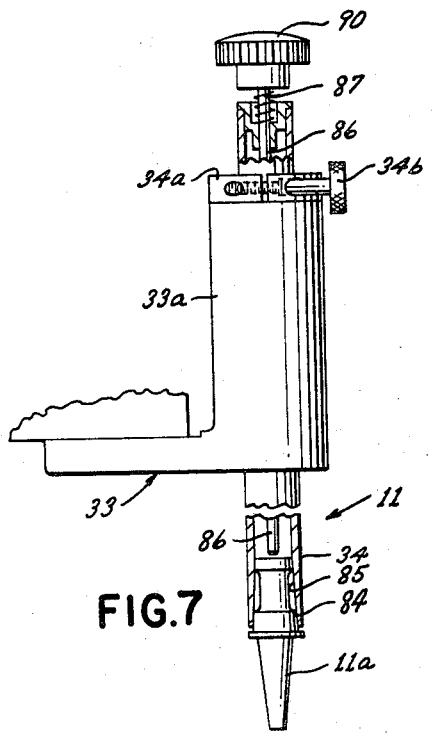
Figure 9:
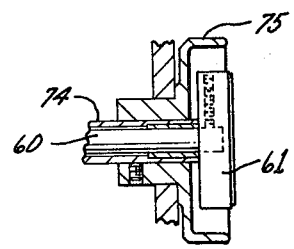

Other objects and advantages of this invention will be apparent from the following description, the appended claims, and the accompanying drawings in which:

FIG. 1 is a perspective view of a measuring machine incorporating one embodiment of this invention, FIG. 2 is a front view illustrating the mechanical structure of the machine of FIG. 1 with part of the outside cabinet cut away and with the workpiece supporting plate and elevating mechanism therefor removed, FIG. 3 is an end view particularly illustrating the mechanical structure of the machine as shown in FIG. 2, with part of the outside cabinet cut away, FIG. 4 illustrates an end view of the machine as shown in FIG. 2 with portions of the cabinet cut away and illustrating means for moving the worktable on the base in a generally horizontal plane, FIG. 5 is an enlarged view showing one of the bearing assemblies supporting the worktable, FIG. 6 is an enlarged front view showing portions of the brake device and fine feed adjustment mechanism for the supporting structure carriage, FIG. 7 is a view of the workpiece measuring element and associated structure with parts in section and parts broken away, FIG. 8 is an enlarged view of portions of the measuring element supporting structure and associated components with parts in section and parts broken away, and FIG. 9 shows the controls for the supporting structure carriage in section.

In the exemplary embodiment of this invention, a measuring machine 10 is illustrated for measuring physical dimensions of a workpiece, not shown, along two mutually perpendicular coordinate axes. Machine 10 has a workpiece measuring element 11, including a work engaging probe 11a, which is movable in three mutually perpendicular directions. In this example the position of element 11 along two perpendicular axes is precisely determined and indicated visually on an electrical display device 12. If desired, indication of the vertical position of element 11 could also be provided in a known manner. In measuring the relative location of holes in a workpiece, for example, probe 11a has a tapered lower end which is located by sequential insertion into the holes of a workpiece mounted on the supporting worktable. Adjustments are provided as later described to insure that movements of probe 11a are accurately aligned relative to the upper surface of the worktable.

As illustrated particularly in FIGS. 1–4 measuring machine 10 has a base 13 carrying a worktable 14 and means on said base, such as a first rigid horizontal beam 15, providing a rigid horizontal way nonadjustably fixed relative thereto in any suitable manner, for example with bolts. Horizontal beam 15 is carried by a pair of spaced apart vertical supports 16 and 17, fixed thereto, spanning therebetween, and having extensions 20 and 21 therebeyond on either side of supports 16 and 17 respectively. Supports 16 and 17 are provided on base 13 and as a part thereof and such supports are preferably made of thick metal plates extending the full depth of machine 10. Each plate 16 and 17 has a horizontal portion supporting worktable 14 and an upward extension at its rear supporting beam 15. Beam 15 carries the load of an inverted generally L-shaped supporting structrue 22 carrying measuring element 11.

Supporting structure 22 as an upright member 23 and a transverse member 24 integral with the upper end of the upright member and extending over worktable 14. In this example transverse member 24 is integrally bolted to member 23 but it will be appreciated that it could be fastened by other means or formed integrally as by metal casting. Supporting structure 22 is carried on beam 15 for movement along an operating path by first carriage means 25 fixed to the supporting structure. The measuring range of said structure 22 along beam 15 is determined by the spacing between said spaced apart supports 16 and 17 and such supports are spaced to provide maximum rigidity of beam 15 in the measuring range without deflection between supports.

To provide increased stability for the movement of structure 22 along beam 15, a second way or beam 18 is adjustably mounted on base 13 substantially parallel to beam 15 and providing a second way means or balance bar along its length. Beam 18 extends between the inner faces of supports 16 and 17 and is carried in a pair of U-shaped sections 16a and 17a fixed to supports 16 and 17 respectively. Screws 18a are threaded vertically through the bottom and at the opposite sides of each of the U-shaped sections and beam 18 is supported and incrementally positioned by such screws. FIG. 8 illustrates the general arrangement of such screws through U-shaped section 16a. Adjustable means such as a recirculating ball bearing assembly 19 is suitably fastened to the lower end of member 23 cooperating between structure 22 and beam 18 for resisting rotation of structure 22 about beam 15 and for adjusting the movement of said structure along the operating path. The adjustment feature of assembly 19 will be described subsequently.

Structure 22 is carried along beam 15 by first carriage means or carriage 25. Carriage 25 has a pair of arms 27 and 28 fixed adjacent the upper end portion of upright member 23 and each of said arms extends to either side thereof and generally parallel to the operating path.

As particularly shown in FIGS. 2 and 8, antifriction bearing means such as recirculating ball bearing assemblies 29 are arranged between arms 27 and 28 and beam 15 carrying the load of structure 22. The ball bearing assemblies 29 are arranged adjacent the extremity of each of said arms and cooperate between said arms and beam 15 carrying the load of structure 22. Each of said arms and the associated bearings cooperate with the horizontal way provided by beam 15 between supports 16 and 17 while respectively extending beyond the corresponding support at each respective extreme end of said measuring range for cooperation with the corresponding extension of horizontal beam 15. Thus at the extreme left end of the measuring range (left side of the machine in FIG. 2), with upright member 23 immediately adjacent support 16, arm 27 extends beyond such support and is carried by extension 20. This mechanical construction assures that throughout the entire measuring range defined by supports 16 and 17, carriage 25 is properly supported with maximum stability.

Each ball bearing assembly 29 is individually adjustable to provide controlled movement of carriage 25 on beam 15. This adjustment is achieved by providing an eccentric pin 30 (see FIG. 8) about which each assembly 29 pivots and is eccentrically positioned to control the distance between each assembly 29 and beam 15. Suitable fastening means such as a pair of bolts, not shown, may also be provided to either side of each pin 30 to fasten each assembly 29 at its pivoted position.

The individual structural members, such as essentric pin, recirculating bearings, etc., and adjustment features, thus described for each bearing assembly 29 are identical to those for bearing assembly 19 previously mentioned.

Thus it will be seen that the angle that transverse member 24 extends relative to beam 15 as well as the angle upright member 23 extends relative to beam 15 may thus be controlled a limited amount by individually adjusting each assembly 29 as well as adjusting bearing assembly 19.

Second carriage means or carriage 32 is provided and supported for movement back and forth on transverse member 24. Means provided for carrying the workpiece measuring element 11 on carriage 32 for movement therewith includes a housing 33 suitably fixed to carriage 32 as shown in FIGS. 3 and 7. Workpiece measuring element 11 includes a vertically adjustable cylinder 34 which carries the work engaging probe 11a. Housing 33 has a vertically extending cylindrical portion 33a which supports a split clamp ring 34a and which clamp ring is tightened or loosened by a clamping screw 34b. Screw 34b has a knurled knob permitting easy clamping action and a shoulder bearing on one side of the split ring while being threaded into the opposite side to produce a controlled clamping and loosening action. Element 11 is thus movable vertically toward and away from the workpiece location to facilitate measurement of the workpiece and may be clamped in any position by screw 34b. Carriage 32 is supported on member 24 by three recirculating bearing assemblies cooperating with V ways along the upper and lower edges of member 24. These bearing assemblies are also adjustable.

In this exemplary embodiment electro-optical means of the type described in detail in U.S. Patent 2,886,717 is provided for determining the positions of workpiece measuring element 11. The electro-optical means for determining movement of element 11 to the left and right as viewed in FIG. 2 comprises a first elongated grating 35 (refer to FIGS. 3 and 8) preferably fabricated from stainless steel having reflective qualities with appropriately spaced lines thereon. Such grating is fixed directly to and extends parallel to the axis of horizontal beam 15. A first reading head 36 is fixed to the first carriage means or carriage 25 and arranged immediately adjacent grating 36 for cooperation therewith such that the extent of movements of carriage 25, and hence element 11, parallel to beam 15 are precisely determined.

For determining movements of element 11 along transverse member 24, a similar electro-optical system is preferably employed as shown in FIG. 3 and comprises a second elongated grating 37 of the type previously described, fixed directly to and extending parallel to the axis of transverse member 24. A second reading head 40 is fixed to carriage 32 and arranged adjacent grating 37 for cooperation therewith such that movements of carriage 32 and element 11 parallel to transverse member 24 are precisely determined. Thus it is seen that with this arrangement the precise position of the workpiece measuring element 11 along two coordinate measuring axes is determined by measuring the precise positions of carriages 25 and 32. Note that with elongated gratings 35 and 37 each fastened directly to their respective members 15 and 24 and parallel to their axes, movements of element 11 along each measuring axis are very precisely determined because the gratings and respective reading heads do not permit introduction of errors which might otherwise occur due to misalignments, or adverse stack up of parts if the respective gratings and/or reading heads were to be spaced away from members 15 and 24. The determined positions of element 11 are visually shown on device 12.

Ease of operation is very important in a precision measuring machine and ease of operation encompasses proper set up of such machine. In the illustrated embodiment of this invention as particularly shown in FIGS. 2 and 3, provision is made for universal movement of worktable 14 with respect to base 13 and includes a pivot bearing such as a ball bearing 41 carried on such base in a suitable recess 41a therein. Ball bearing 41 supports worktable 14 generally at the fore and aft midpoint near one end thereof.

At the opposite end of worktable 14 a pair of identical spaced apart bearings 42 and 43 are provided on base 13 and arranged to support such worktable at its opposite sides—see FIG. 5 for details of such bearings as exemplified by bearing 42. Bearings 42 and 43 have swivel head portions 44a and 44b respectively which are capable of limited swiveling movement and respective flat bearing surfaces 45a and 45b upon which worktable 14 rests. Means for individually vertically adjusting bearings 42 and 43 and hence surfaces 45a and 45b relative to base 13 includes threaded shaft portions 46a and 46b respectively carrying swivel head portions 44a and 44b. By individually threading such shaft portions in and out of base 13, worktable 14 is universally tilted about ball bearing 41.

At that end of worktable 14 supported by bearings 42 and 43 (see FIG. 4), means are provided between such end and base 13 for moving worktable 14 in a generally horizontal plane about such pivot bearing 41. Such means includes a shaft 50 supported for free rotation by worktable 14 and fastened thereto against sidewise movement relative to the worktable at 47. Shaft 50 has threads 51 at one end thereof which are threaded into a portion of the base at 52 and a knurled knob 53 at its opposite end suitably fastened to the shaft. By rotating knob 53 shaft 50 is threaded into more or less engagement with respect to base 13 to thereby slide that corresponding end of worktable 14 across surfaces 45a and 45b while rotating about ball bearing 41. The weight of worktable 14 and the geometric arrangement of the three point support provided by bearings 41, 42, and 43 assure its stability on base 13.

Thus it will be seen that provisions are made for universally moving the worktable on base 13. It will be apparent that with this arrangement with the rigid horizontal way firmly fixed on the base it is possible to tilt, swivel and effectively rotate the worktable to compensate for misalignments in cooperating components and for defects in the mechanical structure.

To provide greater flexibility and ease of operation of the measuring machine a workpiece supporting plate 55 is provided, as shown in FIG. 1, and adjustably carried by worktable 14. Plate 55 is adjustably positioned toward and away from worktable 14 by plate elevating means carried by such worktable including a pair of elevating screws 56 to which plate 55 is fastened. Screws 56 are moved up and down by turning a hand crank 57. Hand crank 57 turns a pair of spaced apart spiral gears fixed on a common shaft rotatably mounted on worktable 14. Each of the spiral gears engages a cooperating spiral gear unit rotatably carried by worktable 14. Each cooperating gear unit has internal threads which cooperate with the external threads of elevating screws 56. By rotating hand crank 57, screws 56 are extended or retracted with respect to worktable 14 to thus suitably position plate 55 relative to the worktable.

The effective extension or length of each arm 27 and 28 to either side of upright member 23 is generally equal and such as to provide a broad, stable base for movement along horizontal beam 15. Effective extension is used to define the distance from upright member 23 that each bearing assembly 29 cooperates between its respective arm and beam 15. Each arm 27 and 28 is arranged generally parallel to the operating path and fixed to upright member 23 effectively below said transverse member 24 a distance less than the effective distance each arm extends from said upright member to thus provide the broad stable base mentioned.

In addition to providing maximum stability for movements of structure 22 along beam 15, it is important that such structure be supported to prevent rotation and improper movement thereof about beam 15. This is achieved by providing about a one to one length ratio for the extension of transverse member 24 from upright member 23 with respect to the effective extension of member 23 below beam 15.

The effective length of member 23 below beam 15 is controlled by correctly locating both the adjustable means or bearing assembly 19 previously described and beam 18 as shown in FIGS. 2 and 8. Assembly 19 is fastened to member 23 at a distance below horizontal beam 15 generally equal to or greater than the effective distance transverse member 24 extends transverse upright member 23. As previously mentioned bearing assembly 19 cooperates between the supporting structure 22 and beam 18 to resist rotation of the structure about beam 15 and for adjusting the movement of structure 22 along the operating path.

By placing assembly 19 and beam 18 a relatively large distance from horizontal beam 15, greater stability is provided for structure 22. In addition the large spacing between bearing assembly 19 and beam 18 from beam 15 minimizes the effect at measuring element 11 of any defects introduced by beam 18 and assembly 19.

As shown particularly in FIGS. 6, 8 and 9, first lock means for locking carriage 25 and the components it supports at a number of positions along beam 15 is provided and comprises a rod 60 rotatably carried by and parallel to transverse member 24. A control such as lever 61 is fastened at the forward end of rod 60 for rotation thereof and for actuation of brake shoe means such as a friction brake 62 having a friction surface 63. Brake 62 is pivotally carried on a threaded shaft 64 carried for free rotation by supporting structure 22. Surface 63 cooperates with a friction surface such as a friction tape 65 fastened along beam 15. The brake 62 in this example of the invention has a tension spring 66 with one end fastened thereto at 67 for holding surface 63 away from beam 15 except during locking. The opposite end of spring 66 is fastened to structure 22 at 70.

Linkage means are provided cooperating between rod 60 and brake 62 such that upon rotation of such rod, the brake is pivoted into and out of engagement. Such linkage comprises a cam 71 fixed at the remote end of rod 60. Cam 71 engages an extensible linkage rod 72 fastened thereto for overriding spring 66 and bringing brake 62 into engagement with beam 15. A stop pin 73 is provided to stop the rotation of rod 60 at the engaged and disengaged positions of brake 62 and suitable detents are also provided for better holding action in such positions.

Fine feed adjustment means is provided and enables incremental precise movement of carriage 25 and hence element 11 parallel to beam 15 after locking carriage 25 on beam 15. Such fine feed adjustment is achieved by a tube 74 carried concentrically about rod 60 and supported on member 24 for rotation independent from rod 60. Tube 74 has a knob 75 fixed thereto and immediately surrounding lever 61 (see FIG. 9) for rotation of such tube. A chain drive wheel 76 is fixed to tube 75 at its opposite end and such wheel engages a chain 77 suspended therefrom. Chain 77 changes rotation in one plane to rotation in another plane at 90° to the first plane while engaging a second chain drive wheel 76a fixed to threaded shaft 64. Thus it will be seen that after energizing brake 62, carriage 25 may be incrementally positioned by rotating knob 75 to thus move carriage 25 and structure 22 with respect to brake 62 by threading in and out of such brake.

Second lock means is provided (FIGS. 2 and 3) for locking the second carriage 32 along the transverse member 24 and includes control means such as a lever 80 fastened at the forward end of a rod 81 which is rotatably carried by member 24 parallel to rod 60. Rod 81 has a pair of diametrically opposed flat sides therealong which permit free movement of carriage 32 with such carriage unlocked. The carriage is simply locked by rotating the flat portions through a 90° angle into engagement with a U-shaped spring clip locking device fixed to carriage 32. A fine feed adjustment with a control knob 82 is also provided for carriage 32.

It will be seen that a machine operator has ready access to the levers and knobs which control the movement of both carriages 25 and 32 and that the controls for both carriages are immediately adjacent each other at the forward end of transverse member 24.

In measuring machines of this type it is of importance that the work engaging probe 11a be carried essentially free from any relative movement between such work engaging probe and the structure which carries such probe while being readily removable. In the illustrated embodiment of this invention friction holding means is provided as shown in FIG. 7 for holding the work engaging probe 11a fixed relative to the element 11 comprising a cylindrical tapered surface 84 cooperating with a female receiving section 85 in cylinder 34. Release means is provided for disengaging probe 11a and includes a rod 86 which is urged upwardly by a spring 87 in cylinder 34 and out of engagement with probe 11a. A knob 90 is provided at the upper end of rod 86 and probe 11a is released by impacting it at its upper end by such rod.

While various indicating means could be provided to indicate the position of the measuring element in the machine illustrated in FIG. 1 a visual display 91 is provided for each axis of movement on electrical display device or console 12. Means are provided for mounting the display console for swivel movement on base 13 and includes an upright column 92 supported for rotation on such base and carrying console 12 at the upper end portion thereof. An operator may adjust the position of such console vertically and to extend over the worktable 14 or away from the worktable while still placing such console at an angle permitting easy viewing during measurement of a given workpiece.

The machine of this invention is uniquely constructed in what may be referred to as a skeletal form. This is a departure from what may be referred to as the conventional construction. The conventional way of building a machine of this type is to construct a heavy base, mount a heavy outside shell or skin thereon, and suspend all structural operating components therefrom. In this invention the opposite is achieved. A basic load carrying skeletal structure is provided, the shell illustrated in section particularly in FIGS. 2 and 3, is basically a lightweight protective cover constructed of a lightweight, sturdy material such as fiberglass or the like.

Thus it is seen that a machine is provided of improved construction and having geometric features making possible improved precision. In conventional machines, including measuring machines, considerable effort is expended to provide precise ways with accurately controlled surfaces. In the machine of this invention, however, the primary load carrying way is fixed on the base, is of simple construction and relatively inexpensively fabricated, however, the structure is such that the worktable, the positions of the workpiece measuring element supporting structure, as well as a stabilizing way are all adjustable to provide the precise movement required in an accurate measuring machine. This is all achieved very efficiently and economically initially, and the features that provide such flexibility also make it possible to adjust for defects or deficiencies in movements caused by wear and usage.

While the form of apparatus herein described constitutes a preferred embodiment of the invention, it is to be understood that the invention is not limited to this precise form of apparatus.

What is claimed is:

1. A precision measuring machine comprising:
   a base,
   means providing a rigid horizontal way nonadjustably fixed relative to said base,
   a worktable mounted on said base for supporting a workpiece located thereon,
   a supporting structure having an upright member and a transverse member integral with the upper end of said upright member extending over said worktable,
   first carriage means fixed to said supporting structure, for carrying said supporting structure in an operating path comprising:
      a pair of arms fixed to said upright member and extending to either side thereof and generally parallel to said operating path,
      antifriction bearing means between said arms and said way carrying the load of said structure,
   second carriage means supported for movement back and forth on said transverse member,
   means for moving said worktable on said base comprising:
      a pivot bearing carried on said base and supporting said worktable generally at the midpoint of one end thereof,
      a pair of spaced apart bearings on said base arranged to support said worktable at opposite sides thereof at the end opposite said one end,
      means for individually adjusting said spaced apart bearings vertically relative to said base to thereby universally tilt said worktable about said pivot bearing relative to the paths of movement of said second carriage means to adjust for misalignments therebetween,
      and means cooperating between said opposite end of said worktable and said base for adjustably moving said opposite end in a generally horizontal plane about said pivot bearing,
   a workpiece measuring element,
   means carrying said workpiece measuring element on said second carriage means for movement therewith and for adjustable positioning relative thereto toward and away from the workpiece location to facilitate measurement of a given workpiece,
   measuring means associated with each of said carriages and providing signals responsive to displacement of each said carriage along its respective operating path determined by the position of said element,
   and indicating means responsive to said signals for indicating the position of each said carriage along its operating path.

2. A precision measuring machine as set forth in claim 1 further comprising:
   a workpiece supporting plate carried by said worktable,
   and plate elevating means carried by said worktable for adjustably positioning said plate toward and away from said worktable to accommodate for different size workpieces.

3. A precision measuring machine comprising:
   a base,
   means providing a rigid horizontal way nonadjustably fixed relative to said base,
   a second way spaced from and substantially parallel to said rigid way,
   means for adjustably mounting said second way on said base,
   a worktable mounted on said base for supporting a workpiece located thereon,
   means for adjustably moving said worktable relative to said base,
   a supporting structure having an upright member and a transverse member integral with the upper end of said upright member extending over said worktable,
   first carriage means fixed to said supporting structure for carrying said supporting structure in an operating path comprising,
      a pair of arms fixed adjacent the upper end portion of said upright member and extending to either side thereof and generally parallel to said operating path,
      antifriction bearing means between each of said arms and said nonadjustable way carrying the load of said structure,
   adjustable bearing means adjacent the lower end of said upright member cooperating between said structure and said second way for resisting rotation of said structure about said rigid horizontal way and for adjusting the movement of said structure along said operating path,
   second carriage means supported for movement back and forth on said transverse member,
   a workpiece measuring element,
   means carrying said workpiece measuring element on said second carriage means for movement therewith and for adjustable positioning relative thereto toward and away from the workpiece location to facilitate measurement of a given workpiece,
   measuring means associated with each of said carriages and providing signals responsive to displacement of each said carriage along its respective operating path determined by the position of said element,
   and indicating means responsive to said signals for indicating the position of each said carriage along its operating path.

4. A precision measuring machine comprising:
   a base,
   a pair of spaced apart supports provided on said base,
   means providing a nonadjustable rigid horizontal way fixed to said spaced apart supports, spanning therebetween, and having extensions therebeyond,
   a second way spaced from and substantially parallel to said rigid horizontal way,
   means for adjustably mounting said second way on said spaced apart supports and spanning therebetween,
   a worktable mounted on said base for supporting a workpiece located thereon,
   means for adjustably moving said worktable relative to said base,
   a supporting structure having an upright member and a transverse member integral with the upper end of said upright member extending over said worktable, said supporting structure having a measuring range of movement between said spaced apart supports and determined thereby,
   first carriage means fixed to said supporting structure for carrying said supporting structure in an operating path comprising:
      a pair of arms fixed to said upright member and extending to either side thereof and generally parallel to said operating path, antifriction bearing means adjacent the extremities of each of said arms cooperating between said arms and said way carrying the load of said structure, each of said arms and the associated bearing means cooperating with said way between said supports and respectively extending beyond the corresponding support at each respective extreme end of said measuring range for cooperation with the corresponding extension of said horizontal way, adjustable bearing means adjacent the lower end of said upright member cooperating between said structure and said second way for resisting rotation of said structure about said rigid horizontal way and for adjusting the movement of said structure along said operating path, second carriage means supported for movement back and forth on said transverse member, a workpiece measuring element, means carrying said workpiece measuring element on said second carriage means for movement therewith and for adjustable positioning relative thereto toward and away from the workpiece location to facilitate measurement of a given workpiece, measuring means associated with each of said carriages and providing signals responsive to displacement of each said carriage along its respective operating path determined by the position of said element, and indicating means responsive to said signals for indicating the position of each said carriage along its operating path.

5. A precision measuring machine comprising:

a base, a first rigid horizontal beam nonadjustably fixed on said base providing first way means along its length, a second beam spaced from and substantially parallel to said first beam providing second way means along its length, means for adjustably mounting said second beam on said base, a worktable mounted on said base for supporting a workpiece located thereon, means for adjustably moving said worktable relative to said base, a supporting structure having an upright member and a transverse member integral with the upper end of said upright member extending over said worktable, first carriage means fixed to said supporting structure for carrying said supporting structure on said first horizontal beam in a rectilinear operating path comprising:

a pair of arms fixed adjacent the upper end portion of said upright member and extending to either side thereof and generally parallel to said operating path, antifriction bearing means between each of said arms and said first horizontal beam carrying the load of said structure, adjustable bearing means adjacent the lower end of said upright member and cooperating between said structure and said second beam for resisting rotation of said structure about said first horizontal beam and for adjusting the movement of said structure along said operating path, second carriage means supported for movement back and forth on said transverse member, a workpiece measuring element, means carrying said workpiece measuring element on said second carriage means for movement therewith and adjustable positioning relative thereto toward and away from the workpiece location to facilitate measurement of a given workpiece, measuring means associated with each of said carriages and providing signals responsive to displacement of each said carriage along its respective operating path determined by the position of said element, and indicating means responsive to said signals for indicating the position of each said carriage along its operating path.

6. A precision measuring machine comprising:

a base, a pair of spaced apart supports provided on said base, a first rigid horizontal beam nonadjustably fixed to said spaced supports, spanning therebetween, having extensions therebeyond, and providing first way means along its length, a second beam spaced from and substantially parallel to said first beam providing second way means along its length, means for adjustably mounting said second beam between said supports, a worktable mounted on said base for supporting a workpiece located thereon, means for adjustably tilting said worktable relative to said base, a supporting structure having an upright member and a transverse member integral with the upper end of said upright member extending over said worktable, said upright member being carried between said spaced apart supports and having a range of movement determined thereby, first carriage means fixed to said supporting structure for carrying said supporting structure on said first horizontal beam in a rectilinear operating path comprising:

a pair of arms fixed to said upright member and extending to either side thereof and generally parallel to said operating path, antifriction bearing means adjacent the extremities of each of said arms cooperating between said arms and said first beam carrying the load of said structure, each of said arms and the associated bearing means cooperating with said first beam between said supports and respectively extending beyond the corresponding support at each respective extreme end of said measuring range for cooperation with the corresponding extension of said first horizontal beam, adjustable bearing means adjacent the lower end of said upright member and cooperating between said structure and said second way means for resisting rotation of said structure about said first rigid horizontal beam and for adjusting the movement of said structure along said operating path, second carriage means supported for movement back and forth on said transverse member, a workpiece measuring element, means carrying said workpiece measuring element on said second carriage means for movement therewith and adjustable positioning relative thereto toward and away from the workpiece location to facilitate measurement of a given workpiece, measuring means associated with each of said carriages and providing signals responsive to displacement of each said carriage along its respective operating path determined by the position of said element, and indicating means responsive to said signals for indicating the position of each said carriage along its operating path.

7. A precision measuring machine comprising:

a base, a first rigid horizontal beam nonadjustably fixed on said base providing first way means along its length, a second beam spaced from and substantially parallel to said first beam providing second way means along its length, means for adjustably mounting said second beam on said base, a worktable mounted on said base for supporting a workpiece located thereon, means for adjustably moving said worktable relative to said base, a supporting structure having an upright member and a transverse member integral with the upper end of said upright member extending over said worktable, first carriage means fixed to said supporting structure for carrying said supporting structure on said first horizontal beam in a rectilinear operating path comprising:

a pair of arms each arranged parallel to said operating path and fixed to said upright member below said transverse member a distance less than the distance each arm extends from said upright member thereby providing a broad stable base for movement along said operating path, antifriction bearing means between each of said arms and said horizontal beam carrying the load of said structure, adjustable means fastened to the lower end of said upright member at a distance below said horizontal beam generally equal to or greater than the effective distance said transverse member extends transverse said upright member, said adjustable means cooperating between said structure and said second beam for resisting rotation of said structure about said horizontal beam and for adjusting the movement of said structure along said operating path, second carriage means supported for movement back and forth on said transverse member, a workpiece measuring element, means carrying said workpiece measuring element on said second carriage means for movement therewith and adjustable positioning relative thereto toward and away from the workpiece location to facilitate measurement of given workpiece, measuring means associated with each of said carriages and providing signals responsive to displacement of each said carriage along its respective operating path determined by the position of said element, and indicating means responsive to said signals for indicating the position of each said carriage along its operating path.

8. A precision measuring machine comprising:

a base, a worktable mounted on said base for supporting a workpiece located thereon, a supporting structure having an upright member and a transverse member integral with the upper end of said upright member extending forwardly over said worktable toward the machine operator's position, first carriage means fixed to said supporting structure for carrying said supporting structure in an operating path along said base, antifriction bearing means between said first carriage means and said base carrying the load of said structure, first lock means for locking said first carriage means on said base carried by said supporting structure and having control means therefor at the forward end of said transverse member for ready operator access, second carriage means supported for movement back and forth on said transverse member above said worktable, a workpiece measuring element, means carrying said workpiece measuring element on said second carriage means for movement therewith and for adjustable positioning relative thereto toward and away from hte workpiece location to facilitate measurement of a given workpiece, second lock means for locking said second carriage means along said transverse member and carried thereby having control means therefor at the forward end thereof adjacent the control means for said first lock means for ready operator access whereby the movement of both said carriages may be easily controlled at one location, measuring means associated with each of said carriages and providing signals responsive to displacement of each said carriage along its respective operating path determined by the position of said element, and indicating means responsive to said signals for indicating the position of each said carriage along its operating path.

9. A precision measuring machine comprising:

a base having a rigid horizontal way nonadjustably fixed relative to said base, a worktable mounted on said base for supporting a workpiece located thereon, a supporting structure having an upright member and a transverse member integral with the upper end of said upright member extending forwardly over said worktable toward the machine operator's position, a first carriage means fixed to said supporting structure for carrying said supporting structure in an operating path on said horizontal way, antifriction bearing means between said first carriage means and said base carrying the load of said structure, a first lock means for locking said first carriage means on said horizontal way comprising:

a rod rotatably carried by and alongside said transverse member, a control fastened to the forward end of said rod for rotation thereof, brake shoe means pivotally carried by said supporting structure for friction engagement of said horizontal way, linkage means cooperating between the end of said rod opposite said forward end and said brake shoe means such that upon rotation of said rod said brake shoe means are pivoted into and out of engagement with said horizontal way, second carriage means supported for movement back and forth on said transverse member, a workpiece measuring element, means carrying said workpiece measuring element on said second carriage means for movement therewith and for adjustable positioning relative thereto toward and away from the workpiece location to facilitate measurement of a given workpiece, second lock means for locking said second carriage means along said transverse member and carried thereby having control means therefor at the forward end thereof adjacent the control means for said first lock means for ready operator access whereby the movement of both said carriages may be easily controlled at one location, measuring means associated with each of said carriages and providing signals responsive to displacement of each said carriage along its respective operating path determined by the position of said element, and indicating means responsive to said signals for indicating the position of each said carriage along its operating path.

10. A precision measuring machine comprising:

a base, a worktable mounted on said base for supporting a workpiece location thereon, a supporting structure having an upright member and a transverse member integral with the upper end of said upright member extending forwardly over said worktable toward the machine operator's position, first carriage means fixed to said supporting structure for carrying said supporting structure in an operating path along said base, antifriction bearing means between said first carriage means and said base carrying the load of said structure, first lock means for locking said first carriage means on said base carried by said supporting structure and having control means therefore at the forward end of said transverse member for ready operator access, second carriage means supported for movement back and forth on said transverse member above said worktable, a workpiece measuring element having a detachable work engaging probe, means carrying said workpiece measuring element on said second carriage means for movement therewith and for adjustable positioning relative thereto toward and away from he workpiece location to facilitate measurement of a given workpiece, friction holding means for holding said work engaging probe fixed relative to said element to assure accurate measurements without movement therebetween, release means for disengaging said probe from said friction holding means to permit changing thereof, second lock means for locking said second carriage means along said transverse member and carried thereby having control means therefor at the forward end thereof adjacent the control means for said first lock means for ready operator access whereby the movement of both said carriages may be easily controlled at one location, measuring means associated with each of said carriages and providing signals responsive to displacement of each said carriage along its respective operating path determined by the position of said element, and indicating means responsive to said signals for indicating the position of each said carriage along its operating path.

11. A precision measuring machine as set forth in claim 8 in which said indicating means comprises:

a visual display device, and means for mounting said display device for swiveling movement on said base, whereby ready access to said lock means and ease of adjusting said display device for easy viewing permit machine operation with minimum operator fatigue.

12. A precision measuring machine comprising:

a base having a rigid horizontal way nonadjustably fixed relative to said base, a worktable mounted on said base for supporting a workpiece located thereon, a supporting structure having an upright member and a transverse member integral with the upper end of said upright member extending forwardly over said worktable toward the machine operator's position, first carriage means fixed to said supporting structure for carrying said supporting structure in an operating path along said base, antifriction bearing means between said first carriage means and said base carrying the load of said structure, first lock means for locking said first carriage means on said base carried by said supporting structure and having control means therefor at the forward end of said transverse member for ready operator access, second carriage means supported for movement back and forth on said transverse member above said worktable, a workpiece measuring element, means carrying said workpiece measuring element on said second carriage means for movement therewith and for adjustable positioning relative thereto toward and away from the workpiece location to facilitate measurement of a given workpiece, second lock means for locking said second carriage means along said transverse member and carried thereby having control means therefor at the forward end thereof adjacent the control means for said first lock means for ready operator access whereby the movement of both said carriages may be easily controlled at one location, a first elongated grating fixed directly to and extending parallel to the axis of said horizontal beam, a first reading head fixed to said first carriage means and arranged immediately adjacent said first grating for cooperation therewith, such that movements of said first carriage parallel to said first horizontal beam are precisely determined, a second elongated grating fixed directly to and extending parallel to the axis of said transverse member, a second reading head fixed to said second carriage means and arranged immediately adjacent said second grating for cooperation therewith such that movement of said second carriage parallel to said transverse member are precisely determined, whereby each precise position of said workpiece measuring element along two coordinate axes is determined by measuring the precise positions of said carriages, and indicating means responsive to said first and second reading heads for indicating said positions.

References Cited

UNITED STATES PATENTS

| | | | |
|---|---|---|---|
| 2,886,717 | 5/1959 | Williamson et al. | 33—125 X |
| 2,995,826 | 8/1961 | Brault | 33—189 |
| 3,239,941 | 3/1966 | Ahmer | 33—1 X |
| 3,286,353 | 11/1966 | Potter | 33—174 |

SAMUEL S. MATTHEWS, *Primary Examiner.*